March 3, 1942.  E. C. MERRILL ET AL  2,275,154

METHOD OF MAKING CAPSULES

Filed July 10, 1940

Edward C. Merrill,
James W. Reddie,
John M. Anderson,
Inventors.
Haynes and Koenig
Attorneys.

Patented Mar. 3, 1942

2,275,154

UNITED STATES PATENT OFFICE 2,275,154

METHOD FOR MAKING CAPSULES

Edward C. Merrill, West Roxbury, James W. Reddie, Hull, and John M. Anderson, Woburn, Mass., assignors to United Drug Company, Boston, Mass., a corporation of Delaware Application July 10, 1940, Serial No. 344,712

9 Claims. (Cl. 18—47.5)

This invention relates to the preparation of capsules and more particularly to the preparation of gelatin capsules containing ingredients such as medicinals.

Among the objects of this invention are the provision of a method for quickly and easily preparing seamless, continuous-wall, capsules (gelatin for example) containing an air free ingredient (medicinal for example); also the provision of a method for the simple and economical preparation of such capsules in quantities. Other objects will be in part obvious and in part pointed out hereinafter.

The invention accordingly comprises the elements and combinations of elements, steps and sequence of steps, features of construction and manipulation, and arrangements of parts which will be exemplified in the methods hereinafter described, and the scope of the application of which will be indicated in the following claims.

In the accompanying drawing in which is shown apparatus for carrying out the invention:

Similar reference characters indicate corresponding parts throughout the several views of the drawing.

For the administration of medicinals, it has become desirable to prepare or enclose the medicinal composition in capsule or pill form. One of the most desirable forms for so enclosing medicinals is a continuous-wall gelatin capsule, the interior of which is occupied by the desired medicinal material. Capsules prepared in this way are leakproof and retain their medicinal effectiveness although stored for long periods, and they are easily administered. They quickly melt or dissolve to release their contents when taken internally, heated or ruptured.

According to the present invention, a method is provided for preparing such gelatin capsules in an improved form and in an easy and convenient manner.

Figure 1:
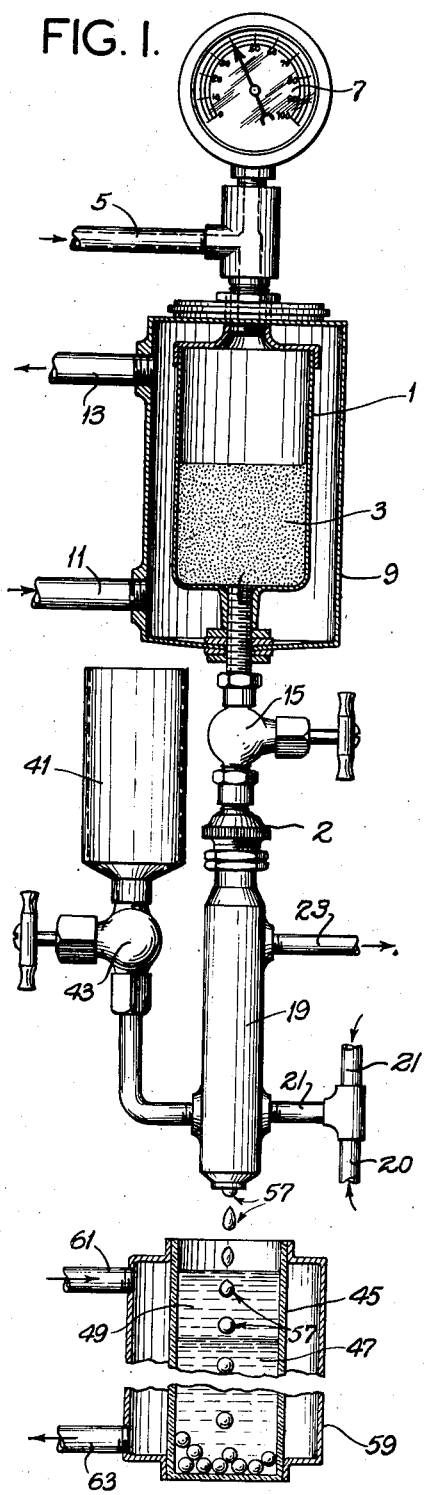
Fig. 1 is a side elevation, parts being shown in section.

Referring now more particularly to Fig. 1, there is shown at numeral 1 a container for gelatin 3. This container 1 has a connection 5 with suitable compressing means for maintaining air pressure on the gelatin. Pressure determination is effected by means of a gauge 7, and may be of the order of 40 pounds per sq. in. or so.

The gelatin mixture may be composed for example of one part glycerin, two parts of gelatin, and a suitable proportion of water. The final mixture may advantageously consist of two parts of the glycerin-gelatin mix and one part of water. This composition may of course be varied, depending on the purpose for which the capsule is to be used, and the convenience of operation. This substance congeals when cooled. It melts when substantially heated and/or made wet.

Around the container 1 is a heating jacket 9. The heating medium in the present example is steam, which passes into the jacket by way of an inlet 11 and out by way of an outlet 13. The inlet 11 and outlet 13 are preferably arranged to cause the steam to counterflow with respect to direction of flow of the gelatin 3 which gravitates downwardly.

An exemplary temperature that may be used in the jacket 9 is 60° C. Higher or lower temperatures may likewise be employed as long as the gelatin mix retains sufficient elasticity to form capsules as described hereinafter with a medicinal preparation enclosed therein. Thus, temperatures substantially below 40° C. are in general to be avoided, since the drops formed are not sufficiently uniform. Temperatures as high as 65° C. may be advantageously employed under some circumstances.

The gelatin is forced from the container 1 out through a control valve 15, which may be of the ordinary needle type. The gelatin then passes into an extrusion tube 17 which is also surrounded by a steam jacket 19 designed to maintain the gelatin as a liquid. The counterflow of steam with respect to the gelatin flow through the tube 17 is established by means of a steam inlet 21 and a steam outlet 23. Water may be introduced at 20 along with the steam to control temperature.

Figure 3:
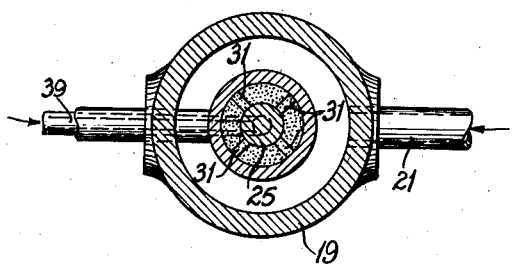
Fig. 3 is an enlarged fragmentary horizontal section taken on line 3—3 of Fig. 2; and, Fig. 4 is an enlarged horizontal section taken on line 4—4 of Fig. 2.
Figure 4:
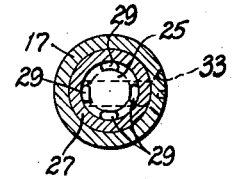

Within the extrusion tube 17 is a circular core 25 supported in spaced relationship at the top by a cup 27 having inlet openings 29 (see also Fig. 4); and near the bottom by means of centering fins 31 (see also Fig. 3). The core 25 is held up by means of a set screw 33. Its lower end is flared, as shown at 35, to provide a suitable annular opening between its lower end and the adjacent lower end of the extrusion tube 17.

The lower end of the core 25 is hollow as shown at 37 and connects with an inlet pipe 39 for the medicinal fluid (such as oil for example) which is to be encased by the gelatin. The connection 39 communicates with a medicinal fluid supply chamber 41. Numeral 43 indicates a control valve for controlling the gravity flow of the medicinal. This may also be a needle valve.

It will be understood that the valves 15 and 43 are adjusted to suit particular consistencies of materials controlled by them respectively.

At 2 is a universal swivel joint for leveling the outlet or nozzle below, indicated generally at 4.

Below the extrusion parts above described is placed a receiver 45. This receiver contains a lower liquid stratum 47 and an upper stratum 49. The strata 47 and 49 are immiscible with respect to gelatin (or other material of which the outside of the capsules is formed) and are immiscible with respect to each other. The stratum 47 is of higher specific gravity, and is at the bottom, and is for cooling purposes. A jacket 59 with cooling water inlet 61 and outlet 63 is employed. The cooling water is carried out at 2° to 5° C. or so. The upper stratum is for eliminating tails. For purpose of example, it may be stated that the cylinder 45 is of the order of 4 ft. long and 2 inches in diameter. In it the top layer of mineral oil 49 is about 8 inches deep. This layer may be of a specific gravity of about .833, for example.

The layer 47 extends down the remainder of the tube depth, and is composed for example of cool diethylene glycol and ethyl alcohol of specific gravity of about 1.02. These last-named substances are miscible with each other, and when mixed in the proper proportion, provide the proper specific gravity to insure that the capsule sinks slowly. For example, with capsules of ordinary gelatin containing mineral oil, the capsule has a net specific gravity of about 1.04 to 1.08. A mixture of about 30% ethyl alcohol and 70% diethylene glycol has the stated specific gravity of about 1.02, and this is satisfactory to permit the capsule to sink slowly and to float the layer 49 of mineral oil.

Operation of the apparatus is as follows:

Air pressure is maintained at the inlet 5 to be impressed upon the gelatin 3 in the container 1, whereby it is extruded downwardly through the extrusion tube 17 and around the core 25.

The temperature of the heating medium which circulates around the container 1 should be such that the gelatin descends under the given pressure, and the temperature around 17 should be such that the gelatin properly exudes from the annular space 51 in the form of droplets as indicated at 53. The temperature of the circulating medium around the extrusion tube 17 maintains the proper conditions and also brings the temperature of the medicinal 37 to that of the gelatin.

The size of the opening 37 is such that the medicinal flowing therefrom at the outlet will also exude as droplets 55 within the droplets 53. An exemplary dimension is 1/16 inch. The remainder of the drawing is to the scale of this 1/16 inch dimension.

As the cylinder of gelatin around 17 slowly emerges from the nozzle, it assumes a spherical shape on its bottom side, due to the surface tension of the gelatin. As the gelatin continues to emerge, with the filling of oil inside the gelatin cylinder, the surface tension constricts it at the point of emergence. This is because of the weight of the already-emerged gelatin, including the oil therein.

This constricting surface tension of the gelatin increases to such a point that the cylindric wall of gelatin can no longer support the weight of the emerged gelatin and oil therein. When that moment comes, the cylindric gelatin wall at the nozzle collapses (closes or snaps across), due to the surface tension of the gelatin itself. This snapping shut of the gelatin results in forming the upper closed end of the emerging drop and results in containing the oil as a drop. This snapping shut of the gelatin also forms the bottom end of the next drop.

Figure 2:
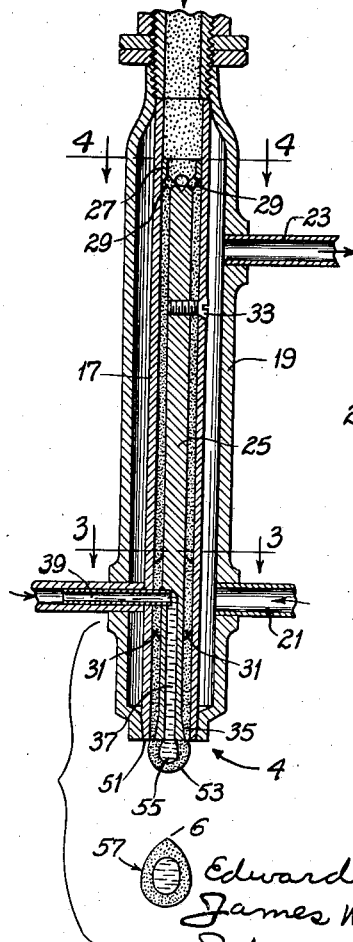
Fig. 2 is an enlarged vertical section of parts of Fig. 1.

The exuded form is such as shown at 57 in Fig. 2. As the droplet 57 descends, its surface tension tends to cause it to assume a more or less spherical form. This form is substantially improved or perfected during the descent of the droplet through the layer 49. Thus its tail 6 is removed. In layer 47 it is cooled and finally solidified.

An exemplary operation is a trickle from the member 19 of droplets at the rate of about 84 per minute, each capsule being 6 mm. in diameter, and weighing about 0.10 gram. The capsules are substantially without tails and are substantially spherical. Slight divergence from spherical form is not always detrimental. Neither is the fact that the medicinal is not necessarily centrally distributed within the gelatin itself, although it is substantially so distributed. The chief advantages are that the medicinal is entirely enclosed and entirely air-free, and that the capsules are without any seam whatsoever.

It will be seen that the various factors such as dimensions, pressure, temperature and control of flow may be regulated to compensate one against the other to provide the most desirable results with various classes of material.

It is to be understood that the invention is applicable to capsules or jackets for other than medication and composed of other suitable ingredients to be used as exudates to form envelopes containing air-free substances.

In view of the above, it will be seen that the several objects of the invention are achieved and other advantageous results attained.

As many changes could be made in the above methods and constructions without departing from the scope of the invention, it is intended that all matter contained in the above description or shown in the accompanying drawing shall be interpreted as illustrative and not in a limiting sense.

We claim:

1. The method of forming gelatin capsules which comprises downwardly extruding said gelatin in liquid form through an orifice, introducing into such extruded gelatin through a pipe located in the center of said orifice a medicinal component, said extrusion being carried out sufficiently slowly so that the gelatin-surrounded medicinal separates into drops by the forces of gravity and surface tension.

2. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out sufficiently slowly so that the medicinal surrounded by the outer layer separates into drops.

3. The method of forming gelatin capsules which comprises downwardly extruding said gelatin in liquid form through an orifice, introducing into such extruded gelatin through a pipe located in the center of said orifice a medicinal component in liquid form, said extrusion being carried out sufficiently slowly so that the gelatin-surrounded medicinal separates into drops by the force of gravity.

4. In the method of forming gelatin capsules containing a medicinal center, the steps which comprises extruding the gelatin component of said capsules in liquid form downwardly through an annular orifice, introducing the desired medicinal components into said gelatin component while the latter is in the orifice, said extrusion being carried out sufficiently slowly so that the combined components separate into drops by the force of gravity.

5. In the method of forming gelatin capsules containing a medicinal center, the step which comprises extruding the gelatin component of said capsules in liquid form downwardly through an annular orifice, introducing the desired medicinal components into said gelatin component while the latter is in the orifice, said extrusion being carried out sufficiently slowly so that the combined components separate into drops.

6. The method of forming capsules which comprises heating liquefiable but normally solid capsule material to liquefy the same, forcing said material in liquid form out of an orifice to form as a liquid droplet the outer layer of the desired capsule, introducing through means located within the orifice an inner component to be contained in the droplet, carrying out said operations, including application of heat to the capsule material, at a rate such that the combination of inner component surrounded by the outer layer separates into an individual falling drop which solidifies after separation.

7. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out at such a rate that the medicinal surrounded by the outer layer separates into drops, and causing the drops to fall into a cooling medium.

8. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out at such a rate that the medicinal surrounded by the outer layer separates into drops, and causing the drops to fall into a cooling medium, the specific gravity of which is less than that of the drops.

9. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out at such a rate that the medicinal surrounded by the outer layer separates into drops, and causing the drops to pass into a cooling medium.

EDWARD C. MERRILL.
JAMES W. REDDIE.
JOHN M. ANDERSON.

DISCLAIMER 2,275,154.—*Edward C. Merrill*, West Roxbury, *James W. Reddie*, Hull, and *John M. Anderson*, Woburn, Mass. METHOD FOR MAKING CAPSULES. Patent dated Mar. 3, 1942. Disclaimer filed Aug. 19, 1946, by the assignee, *United-Rexall Drug Company*.

Hereby disclaims from said patent the claims numbered 1, 2, 3, 4, 5, and 6.

[*Official Gazette September 17, 1946.*]